(12) United States Patent
Kettler et al.

(10) Patent No.: US 9,158,912 B2
(45) Date of Patent: Oct. 13, 2015

(54) METHOD AND APPARATUS FOR A VIRTUAL MACHINE HOSTING NETWORK WITH USER DEVICES

(75) Inventors: Kevin Kettler, Austin, TX (US); David Konetski, Austin, TX (US); Shree A. Dandekar, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 1451 days.

(21) Appl. No.: 12/416,396

(22) Filed: Apr. 1, 2009

(65) Prior Publication Data

US 2010/0257602 A1    Oct. 7, 2010

(51) Int. Cl.
*G06Q 30/00* (2012.01)
*G06F 21/51* (2013.01)
*G06F 21/10* (2013.01)
*H04L 9/32* (2006.01)
*G06F 9/455* (2006.01)

(52) U.S. Cl.
CPC ............ *G06F 21/51* (2013.01); *G06F 9/45558* (2013.01); *G06F 21/10* (2013.01); *H04L 9/32* (2013.01); *G06F 2009/45587* (2013.01); *G06F 2221/0735* (2013.01); *H04L 2209/56* (2013.01); *H04L 2209/603* (2013.01)

(58) Field of Classification Search
USPC .............. 726/26, 16, 21, 59, 71; 380/44, 262, 380/278, 279
See application file for complete search history.

(56) References Cited

U.S. PATENT DOCUMENTS

| | | | |
|---|---|---|---|
| 2003/0014372 A1* | 1/2003 | Wheeler et al. | 705/71 |
| 2007/0015573 A1* | 1/2007 | Angell et al. | 463/29 |
| 2007/0198656 A1* | 8/2007 | Mazzaferri et al. | 709/218 |
| 2008/0147671 A1* | 6/2008 | Simon et al. | 707/10 |
| 2008/0215796 A1* | 9/2008 | Lam | 711/100 |
| 2008/0244034 A1* | 10/2008 | Shannon et al. | 709/217 |

OTHER PUBLICATIONS

//http:www.devicelock.com, DeviceLock Proactive Network Security, Protecting Your Sensitive Data by Managing Peripheral Device Access, 8 pgs, Apr. 22, 2005.
http/www.dailycupoftech.com/2006/09/19/free-virtual-appliances/, Daily Cup of Tech, Sep. 2006, 5 pgs.

\* cited by examiner

*Primary Examiner* — Dante Ravetti
(74) *Attorney, Agent, or Firm* — Terrile, Cannatti, Chambers & Holland, LLP; Stephen A. Terrile (57) ABSTRACT

A simple to customize secure IT infrastructure architecture. The IT infrastructure architecture includes a secure general purpose virtualized architecture platform. The IT infrastructure architecture is well suited for delivering simple prepackaged software solutions to the small business segment as plug and play type appliances. In certain embodiments, the IT infrastructure architecture includes a secure virtual appliance device such as a virtual appliance universal serial bus (USB) key. The IT infrastructure architecture uses embedded server virtualization technology to host applications as a virtual appliance.

7 Claims, 7 Drawing Sheets

METHOD AND APPARATUS FOR A VIRTUAL MACHINE HOSTING NETWORK WITH USER DEVICES

BACKGROUND OF THE INVENTION

1. Field of the Invention

The present invention relates to information handling systems and more particularly to a method and apparatus to secure contents on a consumer virtual appliance.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Consumer electronics devices continue to mature to include consumer electronics type information handling systems. Consumer electronics type information handling systems enable content migration from a media information handling system to a living room as well as enabling televisions for broadband. One example of such a consumer electronics type information handling system includes a digital media adapter (DMA) functionality using software such as the Microsoft extender technology software.

Other issues relating to consumer electronics type information handling systems include limited adoption due to high set up costs and customer awareness. Often known solutions lack flexibility in terms of controlling software and hardware distribution. Often known solutions do not offer personalization.

Attempting to address these issues via known information handling system platforms can also present challenges. For example, known information handling system platforms generally use well-defined development evolution based upon standard architectures. Also within known information handling system platforms, extensibility for added features is usually enabled using add in network interface controllers and controllers within predefined expansion slots such as PCIe slots. Other expansion may be accomplished via an embedded controller for storage and multimedia playback devices. Such platforms have often include well defined end user models for Internet access, email and office type applications as well as the inability to provide a customer with a secure environment to plug in certain desired services or applications.

One such solution is providing virtualization enabled consumer electronics devices. It would be desirable to provide virtualization enabled consumer electronics devices with a plurality of features. For example, it is desirable to ensure security of the content of the virtualization enabled consumer electronics device, which could be an issue should the virtual appliance device be lost or stolen. Also for example, it is desirable to facilitate customer authentication of the virtualization enabled consumer electronics device for use with a host environment such as when the virtualization enabled consumer electronics devices is used with a host which is different from the customer's host. Also for example it is desirable to facilitate re-provisioning a virtual appliance device. Also for example, it is desirable to allow a service provider to provision a virtual appliance device to enable services for which the customer paid.

Accordingly, it would be desirable to provide a secure easily manageable and expandable array of consumer electronics based functions to consumers with limited or no information technology (IT) capabilities.

SUMMARY OF THE INVENTION

In accordance with the present invention, a simple to customize consumer electronics type information handling system infrastructure architecture is provided. The consumer electronics type information handling system infrastructure architecture includes a general purpose virtualized architecture platform. The consumer electronics type information handling system infrastructure architecture is well suited for delivering simple and secure pre-packaged software solutions to a consumer segment as plug and play type appliances. In certain embodiments, the consumer electronics type information handling system infrastructure architecture includes a virtual appliance device such as a virtual appliance universal serial bus (USB) key. The consumer electronics type information handling system infrastructure architecture uses virtualization technology to host consumer applications as a virtual appliance.

More specifically, in certain embodiments, a security module is embedded within the virtual appliance device and the machine hypervisor which executes an authentication on a periodic basis before and during execution of the virtual appliance, thus ensuring that the device is an authorized solution and that the hypervisor is an authorized control agent. The security module may conform to an industry accepted authentication mechanism (e.g., elliptic curve cryptography (ECC) type encryption, RSA type encryption, Diffie Hellman type authentication mechanisms). The authentication process uses an embedded authentication key held in secure memory. The authentication key is only accessible via the embedded security module.

The authentication is both trusted entity type authentication as well as a subsequent user authentication. Private keys embedded in the device are used to authenticate the user, which then in turn unlock services for which the user is subscribed.

The provider of the virtual machine may also embed a unique key within the virtual machine that helps to unlock the subscription services which the customer purchased. When a user plugs in a virtual machine into a virtual host, the virtual machine communicates with a backend service provider server and authenticates the service that the customer purchased.

If a customer loses a virtual appliance device, then the customer can contact the virtual appliance supplier and request a duplicate virtual appliance with the same service enabled. The virtual appliance supplier can then interact with a service provider back end to re-provision the functionality and service keys on a new virtual appliance device. Also, in certain embodiments, the virtual appliance supplier can provide a web interface that allows a customer to re-provision a virtual appliance onto a blank device capable of being used as an original virtual appliance (e.g., a blank USB key).

More specifically, in one embodiment, the invention relates to a method for delivering pre-packaged software solutions to a consumer electronics type information handling system. The method includes providing a virtual machine (VM) host comprising a plurality of VM resources operable to execute virtual machines; providing a virtual appliance device, the virtual appliance device comprising a virtual appliance stored on the virtual appliance device, the virtual appliance comprising an application, the virtual appliance further comprising a security module; installing the virtual appliance onto the virtual machine host via the virtual appliance device; and, hosting the application via the virtual appliance, the hosting further comprising performing an authentication process on a periodic basis before and during execution of the virtual appliance, the authentication process accessing the security module of the virtual appliance.

In another embodiment, the invention relates to an apparatus for delivering pre-packaged software solutions to a consumer electronics type information handling system. The apparatus includes a virtual machine (VM) host comprising a plurality of VM resources operable to execute virtual machines; a virtual appliance device, the virtual appliance device comprising a virtual appliance stored on the virtual appliance device, the virtual appliance comprising an application, the virtual appliance further comprising a security module; means for installing the virtual appliance onto the virtual machine host via the virtual appliance device; and, means for hosting the application via the virtual appliance, the hosting further comprising performing an authentication process on a periodic basis before and during execution of the virtual appliance, the authentication process accessing the security module of the virtual appliance.

BRIEF DESCRIPTION OF THE DRAWINGS

The present invention may be better understood, and its numerous objects, features, and advantages made apparent to those skilled in the art by referencing the accompanying drawings. The use of the same reference number throughout the several figures designates a like or similar element.

DETAILED DESCRIPTION

Figure 1:
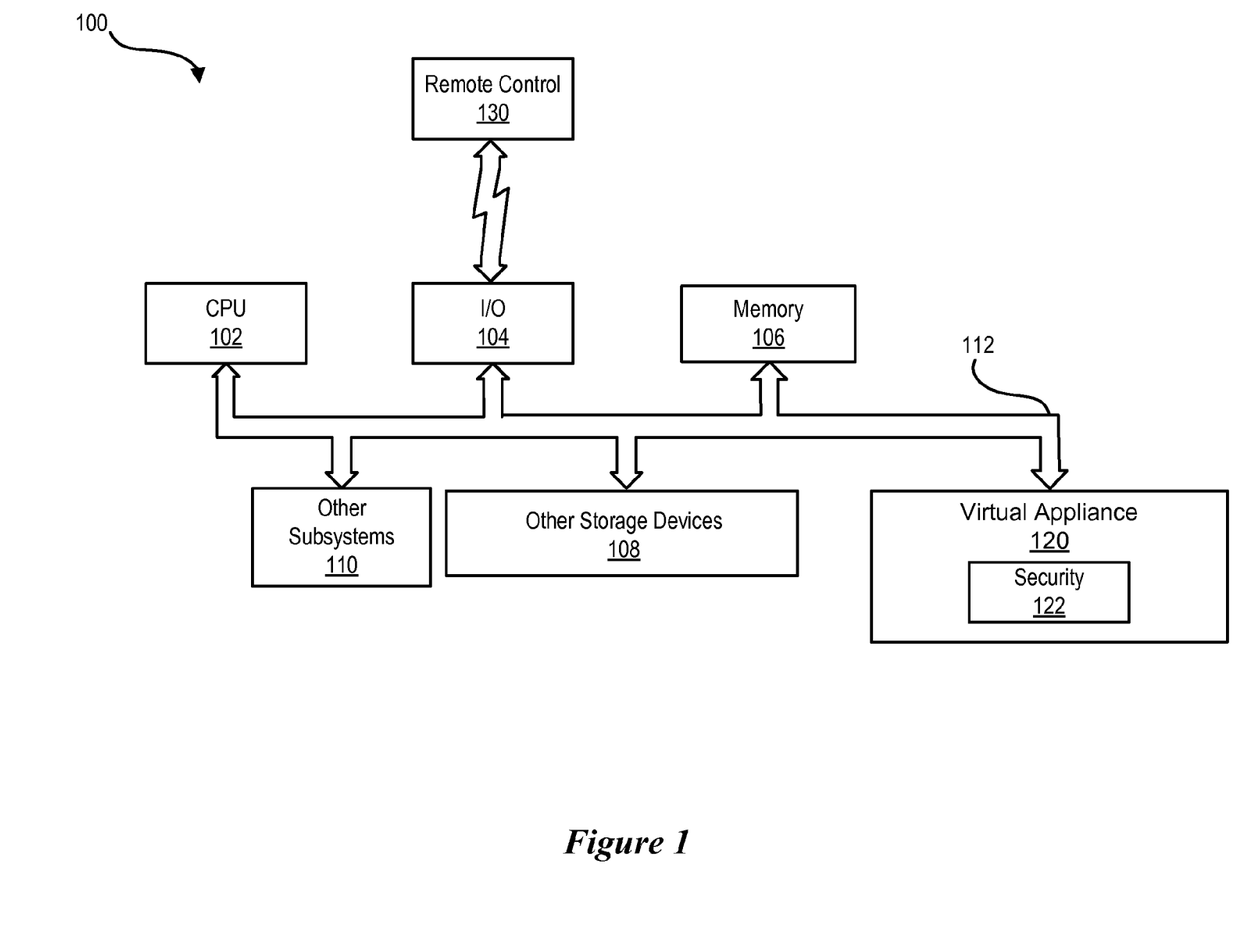
FIG. 1 shows a system block diagram of an information handling system.

Referring briefly to FIG. 1, a system block diagram of a consumer electronics type information handling system 100 is shown. The information handling system 100 includes a processor 102, input/output (I/O) devices 104, such as a display, a keyboard, a mouse, and associated controllers (each of which may be coupled remotely to the information handling system 100), a memory 106 including volatile memory such as random access memory (RAM) and non-volatile memory such as a hard disk and drive, and other storage devices 108, such as an optical disk and drive and other memory devices, and various other subsystems 110, all interconnected via one or more buses 112. The information handling system 100 also includes a a virtual appliance device 120 such as a virtual appliance USB key which may be optionally coupled to the information handling system 100 via the one or more buses 112. The virtual appliance device 120 includes a security module 122. The I/O devices 104 can also include a remote control 130.

The virtual appliance device 120 can include one or a plurality of virtual appliances. Each virtual appliance is a self-contained virtual machine that implements a consumer solution (including an operating system (OS), and application and a default configuration). Examples of self-contained virtual machines can include a productivity module and browser, a media server/content delivery module, a home finance/online banking module, a gaming module, a personal networking module, a home automation and security module, and a home design and maintenance module. Because the virtual machines are self-contained and isolated using virtualization technology, each solution can be preconfigured and ready to use, without a customer having to install and configure the solution. Additionally, the virtual machines provide a stable platform which have no variability when moved from one user or system to another user or system.

Figure 2:
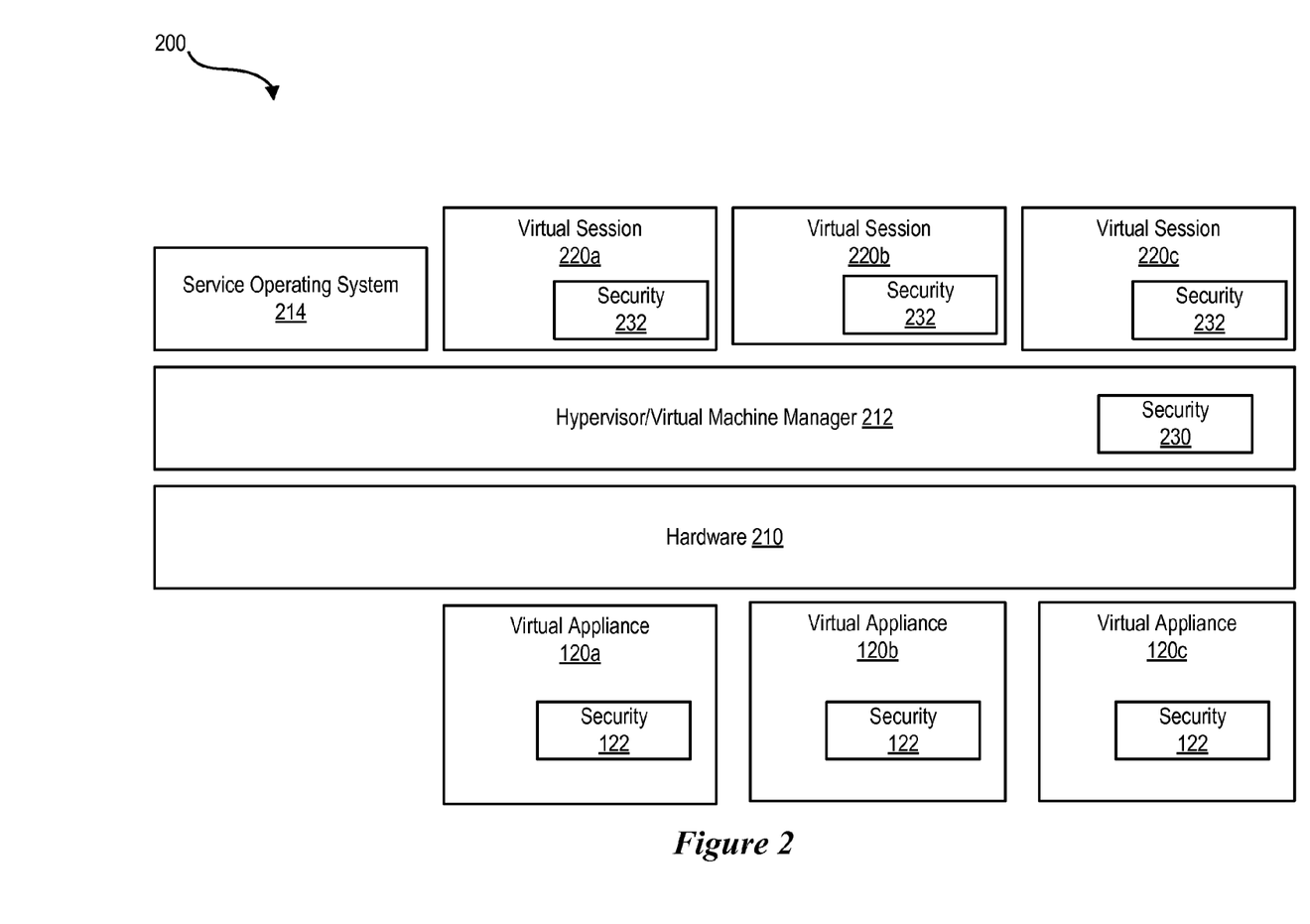
FIG. 2 shows a system block diagram of a consumer electronics type information handling system infrastructure architecture.

Each of the virtual appliances interacts cooperatively with the information handling system 100 via a respective virtual appliance USB key 120 (e.g., a personalization pod). Thus, host and the virtual appliance have a one to many symbiotic relationship. Using a removable virtual appliance device not only simplifies an initial invocation, but also subsequent desire to move the virtual machine. FIG. 2 shows the architecture diagram of the consumer electronics type information handling system 100.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Referring to FIG. 2, a system block diagram of a consumer electronics type information handling system infrastructure architecture 200 is shown. More specifically, consumer electronics type information handling system hardware 210 executes a virtual machine manager application 212 (which may be e.g., a hypervisor). The consumer electronics type information handling system infrastructure architecture 200 also includes a service operating system 214 that is executed by the hardware 210.

One or more virtual appliance devices 120a, 120b, 120c may be coupled to the hardware 210. Each of devices 120 allows a self contained virtual session 220 to be executed by the hardware 210. In certain embodiments, a digital certificate of authenticity (COA) is included with each virtual session 120. The COA is checked by the hardware 210 before the appliance is invoked onto the system 200. The virtual machine manager includes a virtual machine manager security module 230. Also, each virtual session 220 includes a respective security module 232 which may include information from the security module 122.

A data structure with computing resource requirements is included with each virtual appliance device 120. These include CPU requirements, memory requirements, storage requirements, and network bandwidth requirements. Before a virtual appliance is invoked, the virtual machine manager 212 ensures that it has enough capacity to host the appliance. The virtual machine manager 212 also contains a resource meter (which may be located on a panel of the information handling system) to represent current resource capacity and remaining resource capacity to simplify capacity planning. The virtual machine manager 212 can also maintain a database of all virtual machines that have been coupled to the device. Additionally, in certain embodiments, the system may have a more limited set of virtual machines to which the system is authorized. In this case, the virtual machine manager 212 can maintain information regarding the more limited set of virtual machines.

Because the virtual appliance devices are self contained and isolated using virtualization technology, each solution can be preconfigured and ready to use, without a customer having to install and configure the solution. The virtual appliances may be invoked onto the hardware via physical memory devices, such as USB keys, which not only simplify the initial invocation, but also any subsequent move of the virtual machine such as if the capacity of the hardware is exceeded or if a virtual machine is moved from one device to another.

The virtual machine manager 212 is configured to allow only certified appliances to execute on the device. Any time a consumer plugs in a non-certified appliance, the virtual machine manager will prompt the user to use a compatible version, or direct the user to a particular website (e.g., a particular universal resource locator (URL)) where the consumer can purchase or certify particular appliances or applications. In certain embodiments, the authentication and certification may be via an asymmetric encryption such as Diffie-Hellman type encryption, also referred to an asymmetric encryption because it uses two keys instead of a single key. In this case, the public key would be used by the service provider and the private key would be stored securely on the virtual machine or the virtual machine manager.

In certain embodiment, the hardware can include support for high definition playback. The virtual machine manager 212 can thus enable playback of high definition virtual appliance devices on the system. The virtual appliance in this case can include decryption, video and graphics processing, codecs, etc. required for Blu ray type playback.

Figure 3:
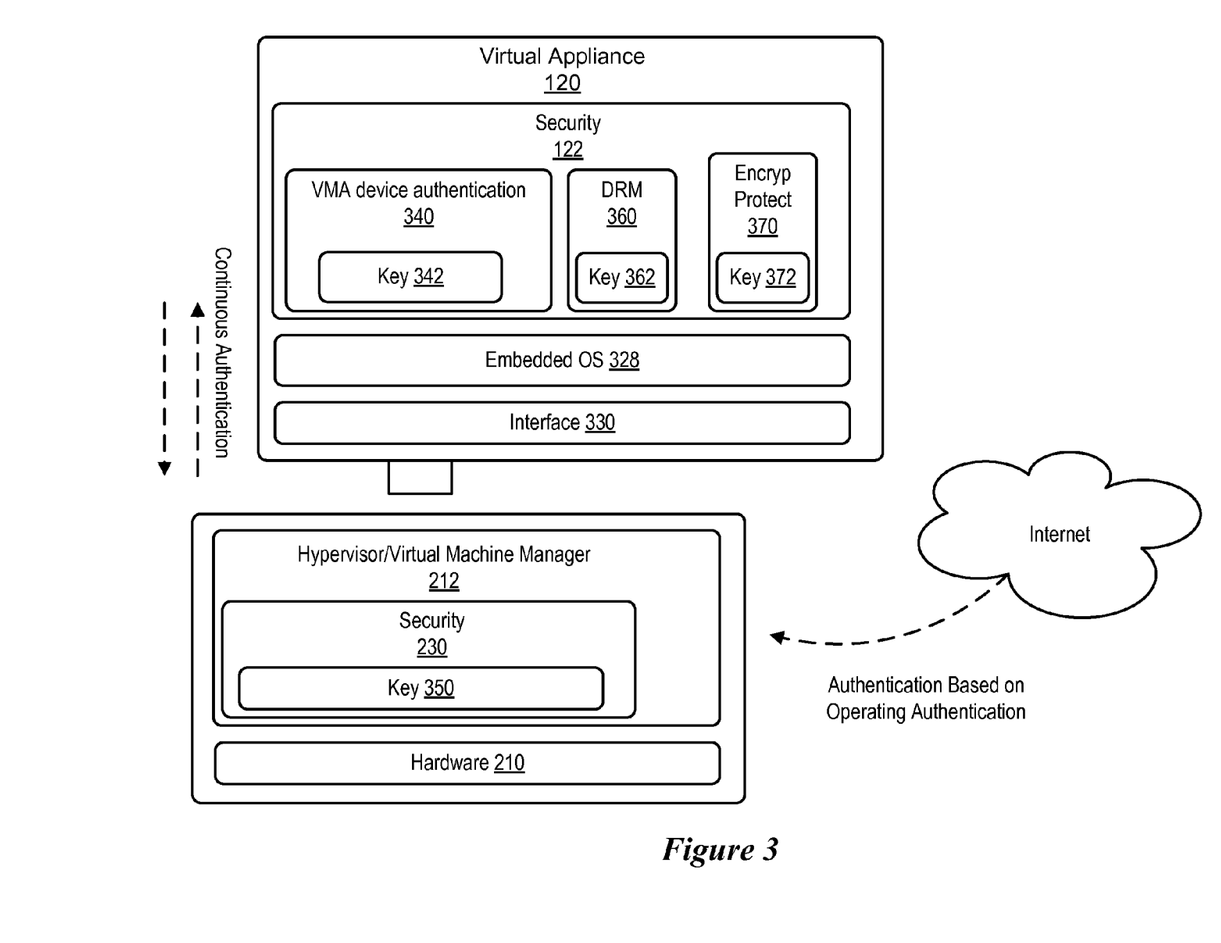
FIG. 3 shows a block diagram of a security module architecture for a consumer electronics type virtual appliance.

Referring to FIG. 3, a block diagram of a security module architecture for a consumer electronics type virtual appliance is shown. More specifically, the virtual appliance 120 includes an embedded operating system 328 as well as a virtual appliance interface 330. The security module 122 includes a virtual appliance device authentication module 240. The virtual appliance device authentication module 340 includes a key 342 (which may be a public key). Additionally, the security module 230 of the virtual machine manager includes a key 350 (which may be a private key). The interaction of the security module 122 of the virtual appliance and the security module 230 of the virtual machine manager provides continuous authentication of the virtual appliance 120.

Security modules 122, 230 are embedded within the virtual appliance device and the machine hypervisor, respectively, which execute an authentication on a periodic basis before and during execution of the virtual appliance, thus ensuring that the virtual appliance is an authorized solution and that the hypervisor is an authorized control agent. The security modules 122, 230 may conform to an industry accepted authentication mechanism (e.g., elliptic curve cryptography (ECC) type encryption, RSA type encryption, Diffie Hellman type authentication mechanisms). The authentication process uses an embedded authentication key 342 held in secure memory. The authentication key 350 is accessible via the embedded security module 230. Also, the security module 122 may access to the authentication key 342 via the VMA device authentication module 340.

The authentication may be both trusted entity type authentication as well as a subsequent user authentication. Private keys embedded in the virtual appliance device are used to authenticate the user, which then in turn unlock services for which the user is subscribed.

For example, in certain embodiments, the security module 122 of virtual appliance 120 further includes a digital rights management module 360 which includes a corresponding DRM key 362. The digital rights management module 360 defines, pursuant to content rules, what a user is allowed to do with content that is executed by the virtual appliance. Also in certain embodiments, the security module 122 of the virtual appliance includes an encryption protection module 370 which includes a corresponding encryption protection key 372. The encryption protection module provides an encryption function to prevent content executing on the virtual appliance from being improperly copied. The digital rights management module 360 and the encryption protection module 370 access and interact with appropriate service providers via the hardware 210 and a communication network such as the Internet.

A provider of the virtual machine may also embed a unique key within the virtual machine that helps to unlock any subscription services which the customer purchased. When a user plugs in a virtual machine into a virtual host (e.g., via virtual machine manager 212), the virtual machine communicates with a backend service provider server (e.g., via the Internet) and authenticates the services that the customer purchased.

If a customer loses a virtual appliance device, then the customer can contact the virtual appliance supplier and request a duplicate virtual appliance with the same service enabled. The virtual appliance supplier can then interact with a service provider back end to re-provision the functionality and service keys on a new virtual appliance device. Also, in certain embodiments, the virtual appliance supplier can develop a web interface that allows a customer to re-provision a virtual appliance onto a blank device capable of being used as an original virtual appliance (e.g., a blank USB key).

Also, in certain embodiments, if a customer virtual appliance is stolen and the thief attempts to use the virtual appliance on a virtualization enabled host, the thief will be asked for the credentials for authentication. More specifically, in certain embodiments, a security algorithm can be set up within the virtual machine that detects a different host and requests user credential. Additionally, in certain embodiments, a security algorithm can be included within the host that detects a new virtual machine and requests user credentials before allowing execution of the virtual appliance. Additionally, in certain embodiments, a backend service can alert the user that the module has been re-provisioned. The user can choose to abort, or upon providing authentication, can elect to have the service reinvoked.

Figure 4:
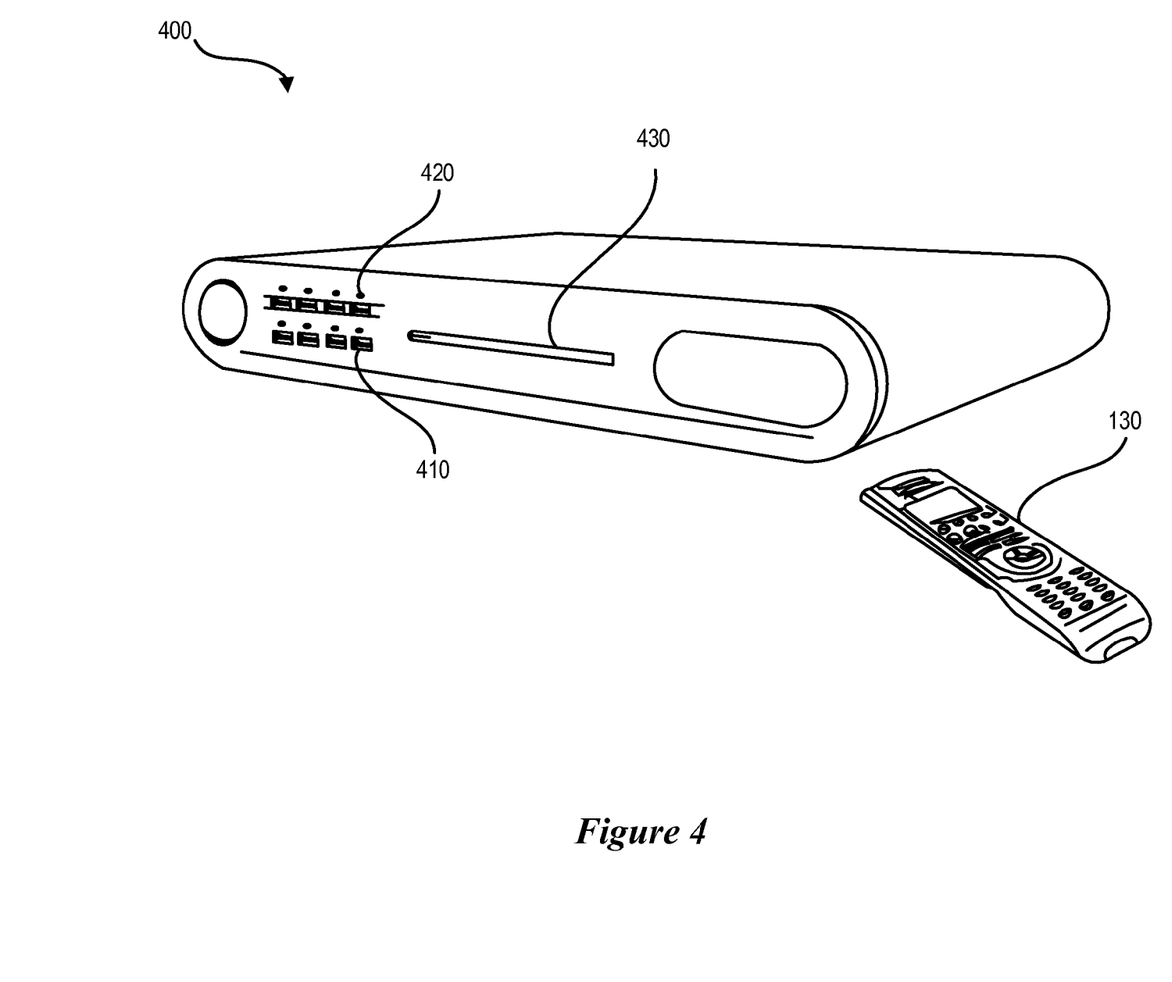
FIG. 4 shows a conceptual perspective view of a consumer electronics type information handling system.

Referring to FIG. 4, a conceptual perspective view of a consumer electronics type information handling system is shown. More specifically, the consumer electronics type information handling system 400 includes a plurality of virtual appliance device connections 410 (e.g., USB connections). Each virtual appliance device connection includes a corresponding connection indication 420. The connection indication 420 can include an indicia (e.g., a color indication) of whether a virtual appliance is invoked and executing on the consumer electronics type information handling system 100. The consumer electronics type information handling system 400 also includes a slot 430 into which additional media (such as e.g., a DVD or CD-ROM) may be inserted. The consumer electronics type information handling system 400 also includes a provision for communicating (e.g., an infrared receiver located on the front panel of the system with the remote control device 130 or other types of I/O devices.

Figure 5:
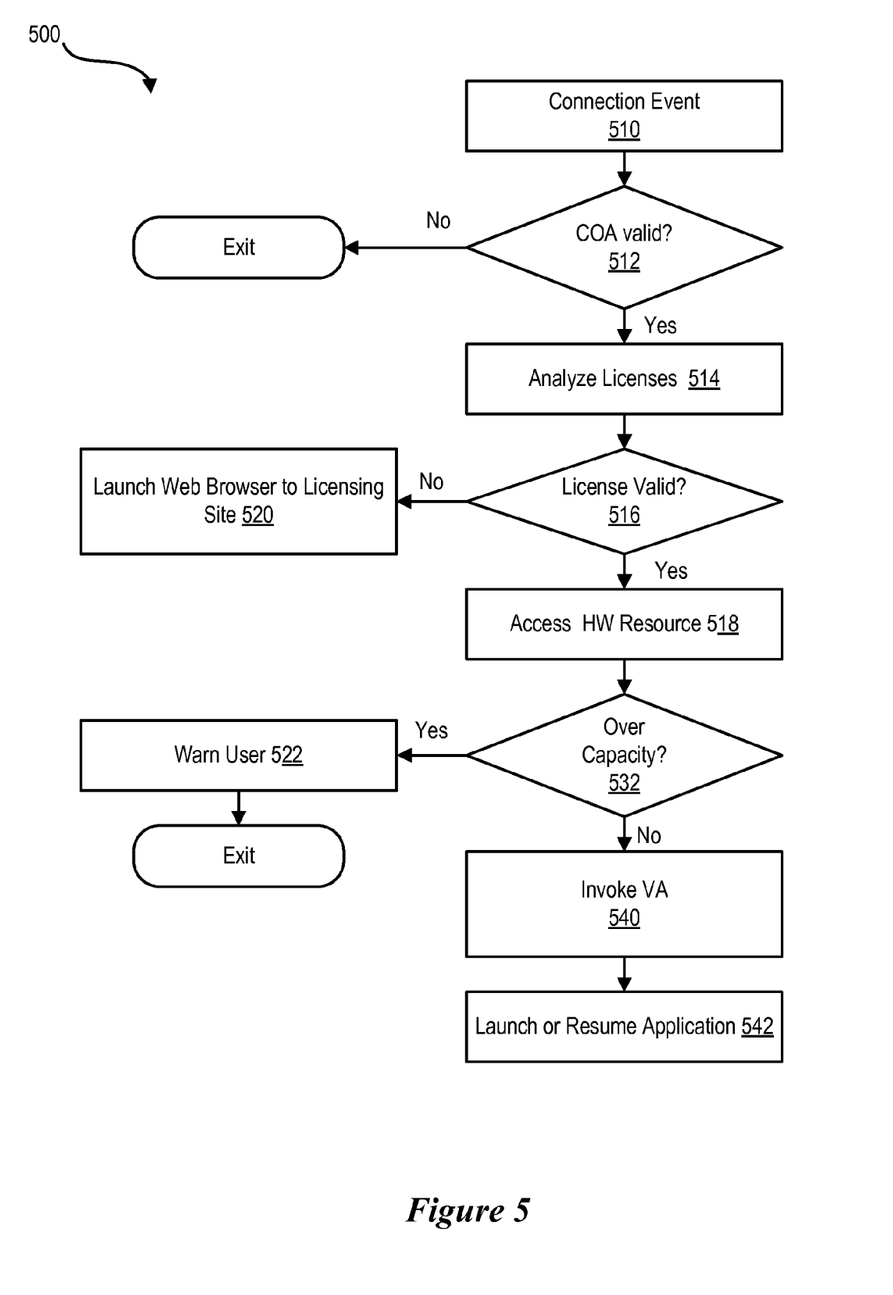
FIG. 5 shows a flow chart of the operation of a consumer electronics type information handling system infrastructure architecture.

Referring to FIG. 5, a flow chart of the operation of a virtual appliance invocation module 500 is shown. More specifically, when the virtual machine manager 212 detects a virtual appliance connection event at step 510, the virtual machine manager 212 determines whether the key of the virtual appliance device authentication module 340 is an authorized virtual appliance (VA) key (e.g., is the virtual appliance COA valid) at step 512. If the virtual appliance is not valid, then the virtual appliance invocation operation exits. If the virtual appliance is valid, then the virtual machine manager 212 analyzes the licenses at step 514 and determines whether the virtual appliance includes a valid license at step 516. If the license is not valid, then the virtual appliance invocation operation launches a web browser to access a virtual appliance licensing set at step 520.

If the license is valid, then the virtual appliance invocation operation accesses the resources of the hardware at step 518. The virtual appliance invocation operation then determines whether the hardware 210 is over capacity at step 532 based upon the available resources of the hardware 210 as well as the resources needed by the virtual appliance. If the hardware 210 is over capacity then the virtual appliance invocation operation warns the user at step 534. If the resource of the hardware 210 is exceeded (e.g., as determined by step 532), the user is warned by a front panel indicator of this condition. The user may proceed with a number of options. The user can ignore the warning and leave the virtual appliance device 120 in the system, in which case the system performance may degrade. Alternately, the user may remove the virtual appliance device from the system and insert the device into another system with more system resource capacity. Alternately, the user may remove other virtual appliances to free up resource.

If the hardware 210 is not over capacity then the virtual appliance is invoked at step 540. Next, the virtual appliance invocation operation launches or resumes the application at step 542.

Figure 6:
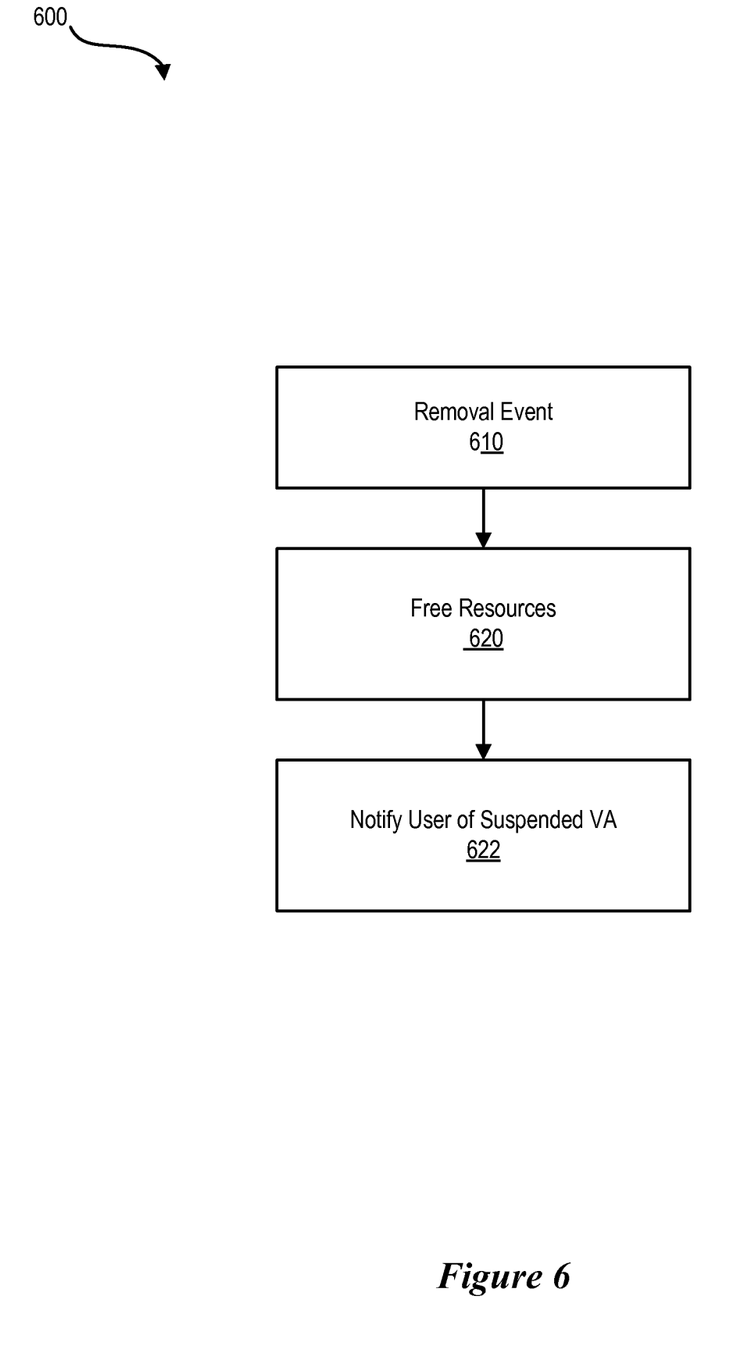
FIG. 6 shows a flow chart of the operation of a consumer electronics type information handling system infrastructure architecture.

Referring to FIG. 6, a flow chart of the operation of a virtual appliance removal module 600 is shown. More specifically, when the virtual machine manager 212 detects a virtual appliance device removal event at step 610, the virtual machine manager 212 frees up resources used by the virtual appliance at step 620 and generates a notification of the removal of the virtual appliance at step 622. The front panel of the information handling system 100 also indicates the removal of the device.

Figure 7:
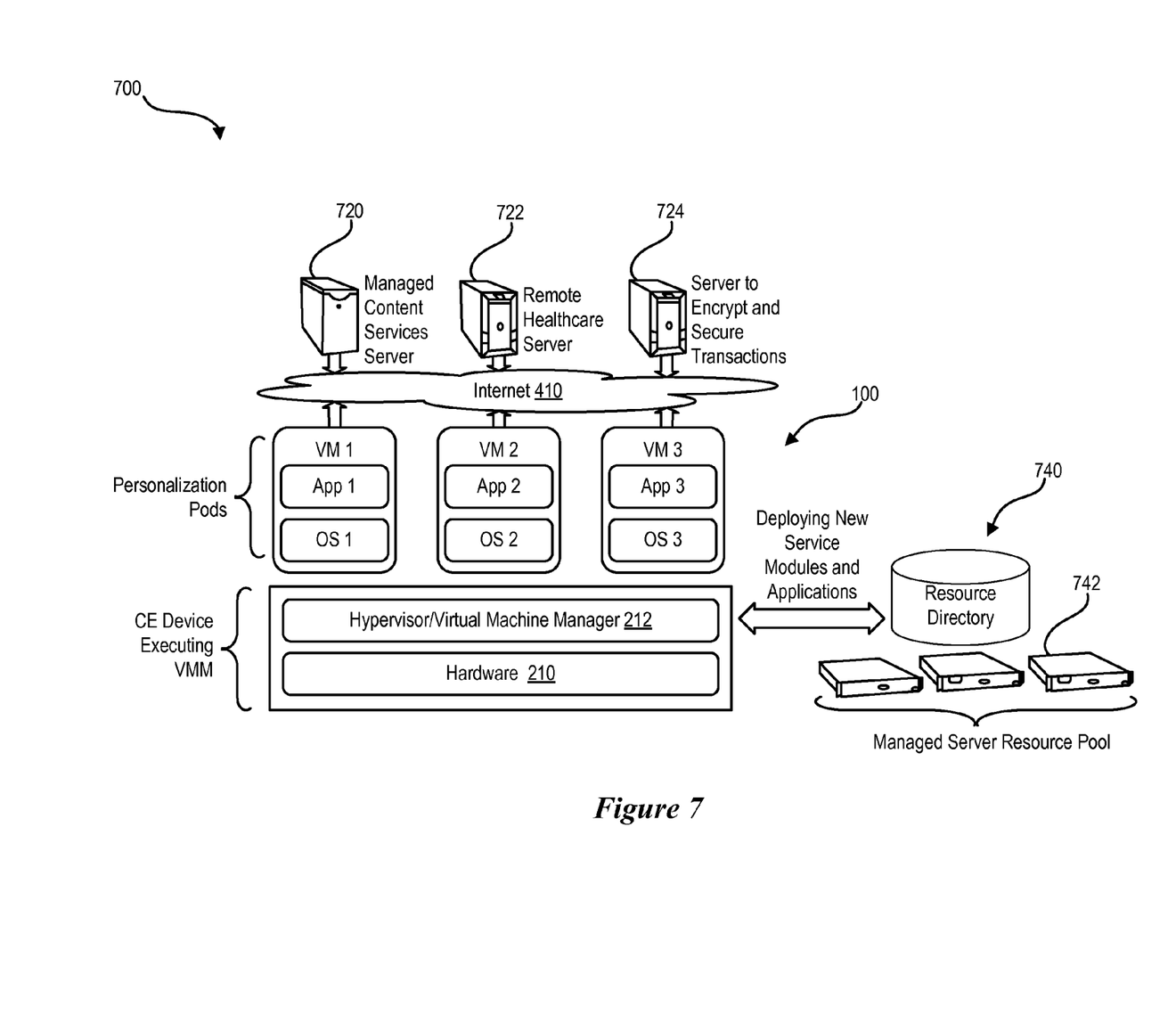
FIG. 7 shows a block diagram a consumer electronics type information handling system architecture environment.

FIG. 7 shows a block diagram a consumer electronics type information handling system architecture environment 700. More specifically, the information handling system 100 includes a plurality of application specific virtual machines (VM1, VM2, and VM3), which are loaded via respective virtual appliance devices. Each application specific virtual machine includes a corresponding operating system (OS1, OS2, and OS3) as well as a corresponding application (App1, App2, and App3). The operating systems and applications execute on the hardware 210 under the control of the virtual machine manager 212. The virtual machines can access the Internet 710, either directly or via the hardware 210 of the system 100.

Each application may be directed to a particular consumer type application. For example, one application (e.g., App1) interacts with a managed content services server 720 via the Internet 710. Examples of manage content services include music types of services (such as download services or streaming radio services), video types of services (such as download services or video access services). The virtual appliance device for this application includes security functionality corresponding to the application. Another application (e.g., App2) interacts with a remote healthcare server 722 via the Internet 710. The remote healthcare server enables a user to interact with hospitals or other types of health care services. The virtual appliance security module for this application includes any encryption information or patient information to facilitate the interaction with the healthcare server 722. Another application (e.g., App3) interacts with a banking server 724 via the Internet 710. The banking server enables a user to interact with various banks to perform various online banking transactions. The virtual appliance security module for this application includes any encryption information or customer information to facilitate the interaction with the banking server 722.

The consumer electronics type information handling system architecture environment 700 also includes a resource directory 740 having an associated managed server resource pool 742. The resource directory 740 is accessed by the system 100 when a virtual machine is coupled to the system to validate the virtual machine. The resource directory 740 can also provide service or update information to the system for each certified virtual machine.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Also for example, the virtual machine manager may include a unique user interface that executes on the hypervisor and display the current services that the customer can access. The user interface can also include notifications and messages to the user for different events and exceptions in a user friendly format.

Also for example, the above-discussed embodiments include software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention may also include a semiconductor-based memory, which may be permanently, removably, or remotely coupled to a microprocessor/memory system. Thus, the modules may be stored within a computer system memory to configure the computer system to perform the functions of the module. Other new and various types of computer-readable storage media may be used to store the modules discussed herein. Additionally, those skilled in the art will recognize that the separation of functionality into modules is for illustrative purposes. Alternative embodiments may merge the functionality of multiple modules into a single module or may impose an alternate decomposition of functionality of modules. For example, a software module for calling sub-modules may be decomposed so that each sub-module performs its function and passes control directly to another sub-module.

Consequently, the invention is intended to be limited only by the spirit and scope of the appended claims, giving full cognizance to equivalents in all respects.

What is claimed is:

1. A method for delivering pre-packaged software solutions to a consumer electronics type information handling system comprising:
   providing, by the server processor, a virtual machine (VM) host comprising a plurality of VM resources;
   executing, by the server processor, the plurality of VM resources respective virtual machines, the virtual machine host executing on an information handling system;
   providing a virtual appliance device, the virtual appliance device comprising a virtual appliance stored on the virtual appliance device, the virtual appliance comprising an application, the virtual appliance further comprising a security module;
   installing, by the server processor, the provided virtual appliance onto the virtual machine host via the virtual appliance device, the virtual appliance device comprising a virtual appliance universal serial bus (USB) key;
   coupling, by the server processor, one or more provided virtual appliance devices to hardware;
   executing, by the hardware, a self-contained virtual session with the provided virtual appliance device;
   including, by the hardware, a digital certificate of authenticity (COA) with each executed virtual session;
   determining, by the hardware, that the virtual appliance (COA) is valid;
   based on a determination that the virtual appliance (COA) is valid, analyze the virtual appliance and determines whether the virtual appliance includes a valid license;
   based on a determination that the virtual appliance does not include a valid license, launching a web browser that accesses a virtual appliance licensing set;
   based on a determination that the virtual appliance does include a valid license, accessing the resources of the hardware;
   determining whether the hardware is over capacity based on the available resources of the hardware as well as the resources needed by the virtual appliance;
   hosting, by the appliance device processor, the application via the virtual appliance;
   performing, by the appliance device processor, an authentication process on a periodic basis before and during execution of the virtual appliance, the authentication process accessing the security module of the virtual appliance.

2. The method of claim 1 wherein:
the virtual appliance device comprises an embedded service provider unique key, the embedded service provider unique key facilitating unlocking of a service.

3. The method of claim 1 wherein:
the authentication process uses an embedded authentication key held in secure memory;
and, the authentication key is only accessible via the security module.

4. The method of claim 1 wherein:
the authentication comprises a trusted entity type authentication and a subsequent user authentication.

5. The method of claim 1 wherein:
public keys are embedded in the virtual appliance device, the public keys authenticate a user;
authenticating the user unlocks previously locked services for which the user is subscribed.

6. The method of claim 1 wherein:
the customer obtains a duplicate virtual appliance from a virtual appliance supplier; and, the virtual appliance supplier interacts with a service provider back end to re-provision functionality and service keys on a new virtual appliance device.

7. The method of claim 1 wherein:
determining an unauthorized attempt to use the virtual appliance on a virtualization enabled host by an unauthorized user, the unauthorized user is asked for the credentials for authentication before being allowed to access the virtual appliance.

\* \* \* \* \*